(12) United States Patent
S

(10) Patent No.: US 11,372,569 B2
(45) Date of Patent: Jun. 28, 2022

(54) DE-DUPLICATION IN MASTER DATA MANAGEMENT

(71) Applicant: SAP SE, Walldorf (DE)

(72) Inventor: Anbusivam S, Bangalore (IN)

(73) Assignee: SAP SE, Walldorf (DE)

( * ) Notice: Subject to any disclaimer, the term of this patent is extended or adjusted under 35 U.S.C. 154(b) by 457 days.

(21) Appl. No.: 15/987,576

(22) Filed: May 23, 2018

(65) Prior Publication Data

US 2019/0361621 A1 Nov. 28, 2019

(51) Int. Cl.
*G06F 3/06* (2006.01)
*G06F 16/23* (2019.01)

(52) U.S. Cl.
CPC .......... *G06F 3/0641* (2013.01); *G06F 3/0608* (2013.01); *G06F 3/0673* (2013.01); *G06F 16/2365* (2019.01); *G06F 16/2379* (2019.01)

(58) Field of Classification Search
CPC ............. G06F 16/9024; G06F 16/2379; G06F 16/2365; G06F 3/0608; G06F 3/0673
See application file for complete search history.

(56) References Cited

U.S. PATENT DOCUMENTS

| | | | | |
|---|---|---|---|---|
| 2009/0234826 A1* | 9/2009 | Bidlack | ................. | G06F 16/215 |
| 2013/0124468 A1* | 5/2013 | Akirav | ................ | G06F 11/2094 |
| | | | | 707/610 |
| 2013/0290690 A1* | 10/2013 | Nucci | ................. | H04L 41/0843 |
| | | | | 713/1 |
| 2015/0269086 A1* | 9/2015 | Yasuda | ............... | G06F 12/1009 |
| | | | | 711/114 |
| 2015/0269171 A1* | 9/2015 | Ebiyama | ........... | G06F 16/24524 |
| | | | | 707/803 |
| 2017/0206372 A1* | 7/2017 | Jung | ..................... | G06F 16/951 |
| 2018/0089233 A1* | 3/2018 | Kabra | ................. | G06F 16/2365 |
| 2018/0300489 A1* | 10/2018 | Roth | ................... | H04L 67/2842 |
| 2019/0004726 A1* | 1/2019 | Li | ......................... | G06F 3/0688 |

* cited by examiner

*Primary Examiner* — Apu M Mofiz
*Assistant Examiner* — Farhad Agharahimi
(74) *Attorney, Agent, or Firm* — Buckley, Maschoff & Talwalkar LLC

(57) ABSTRACT

A method and system including at least one application, wherein a data storage is associated with each application; a de-duplication module; a de-duplication processor in communication with the de-duplication module and operative to execute processor-executable process steps to cause the system to: receive a data storage for each of the at least one application, wherein a first data storage and a second data storage include a same record or the one data storage includes two or more of the same record; separate the records into a key portion and a data portion; assign an internal key to each record, wherein the internal key is stored in both the key portion and the data portion for that record; calculate a golden record including golden record values; assign a golden record internal key to the golden record; replace each internal key in the key portion with the golden record internal key; and remove the data portion of each data record where the internal key in the data portion is different from the internal key in the key portion. Numerous other aspects are provided.

20 Claims, 11 Drawing Sheets

FIG. 4A

| Customer ID | Customer Type | Person Name | OrgName | Building No | Street Address | City | State | Country | Email | Phone | Identification Type | Identification ID |
|---|---|---|---|---|---|---|---|---|---|---|---|---|
| C00001 | Organization | | SAP Palo Alto | 3410 | Hillview Ave | Palo Alto | Cali | USA | sap@sap.com | 650-849-4000 | CINNO | CK000011123 |

FIG. 4B

| Customer ID | Customer Type | Person Name | OrgName | Building No | Street Address | City | State | Country | Email | Phone | Identification Type | Identification ID |
|---|---|---|---|---|---|---|---|---|---|---|---|---|
| ORG001 | Org | | SAP Palo Alto | 3410 | Hillview Ave, 94304 | Palo Alto | California | USA | sap@sap.com | | CINNO | CK000011123 |

FIG. 4C

| Customer ID | Customer Type | Person Name | OrgName | Building No | Street Address | City | State | Country | Email | Phone | Identification Type | Identification ID |
|---|---|---|---|---|---|---|---|---|---|---|---|---|
| BP0033 | Organization | | SAP Palo Alto | 3410 | Hillview Avenue, 94304 | Palo Alto | CA | USA | sap@sap.com | +1 650-849-4000 | CINNO | CK000011123 |

FIG. 7

| | | | | | | | | | | | | | |
|---|---|---|---|---|---|---|---|---|---|---|---|---|---|
| Application | Customer ID | Internal Key | | Internal Key | Customer Type | OrgName | Building No | Street Address | City | State | Country | Email | Phone | Identification Type | Identification ID |
| App1 | C00001 | IK001 | → | IK001 | Organization | SAP Palo Alto | 3410 | Hillview Ave | Palo Alto | Cali | USA | sap@sap.com | 650-849-4000 | CINNO | CK000011123 |
| App2 | ORG001 | IK002 | → | IK002 | Org | SAP-Palo Alto | 3410 | Hillvw Ave, 94304 | Palo Alto | California | USA | sap@sap.com | | CINNO | CK000011123 |
| App3 | BP0033 | IK003 | → | IK003 | Organization | SAP, Palo Alto | | 3410 Hillview Avenue, 94304 | Palo Alto | CA | USA | sap@sap.com | +1 650-849-4000 | CINNO | CK000011123 |

FIG. 8

| Golden Record | Customer Type | Person Name | OrgName | Building No | Street Address | City | State | Country | Email | Phone | Identification Type | Identification ID |
|---|---|---|---|---|---|---|---|---|---|---|---|---|
| | Organization | | SAP Palo Alto | 3410 | Hillview Avenue, 94304 | Palo Alto | California | USA | sap@sap.com | +1 650-849-4000 | CINNO | CK000011123 |

| Application | Customer ID | Customer Type | Internal Key | OrgName | Building No | Street Address | City | State | Country | Email | Phone | Identification Type | Identification ID |
|---|---|---|---|---|---|---|---|---|---|---|---|---|---|
| App1 | C0001 | Organization | | SAP, Palo Alto | | 3410 Hillview Avenue, 94304 | Palo Alto | CA | USA | sap@sap.com | +1 650-849-4000 | CINNO | CK000011123 |
| App2 | ORG001 | Organization | | SAP, Palo Alto | | 3410 Hillview Avenue, 94304 | Palo Alto | CA | USA | sap@sap.com | +1 650-849-4000 | CINNO | CK000011123 |
| App3 | BP0033 | Organization | | SAP, Palo Alto | | 3410 Hillview Avenue, 94304 | Palo Alto | CA | USA | sap@sap.com | +1 650-849-4000 | CINNO | CK000011123 |
| | Golden Record | Organization | | SAP, Palo Alto | | 3410 Hillview Avenue, 94304 | Palo Alto | CA | USA | sap@sap.com | +1 650-849-4000 | CINNO | CK000011123 |

*FIG. 9*
(PRIOR ART)

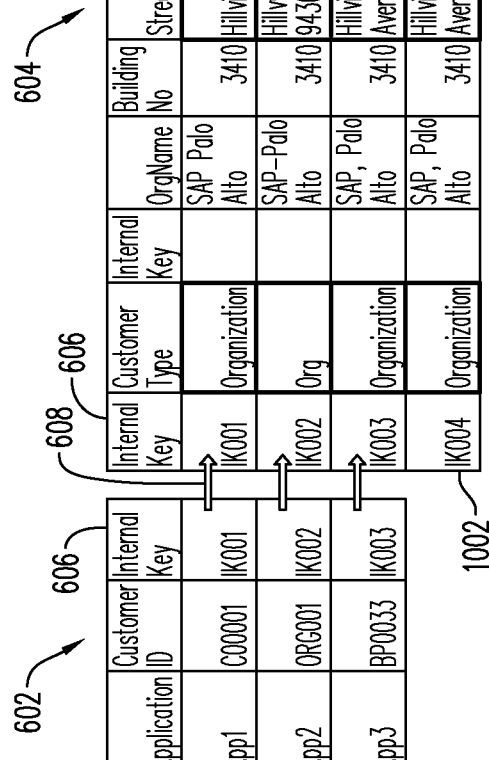
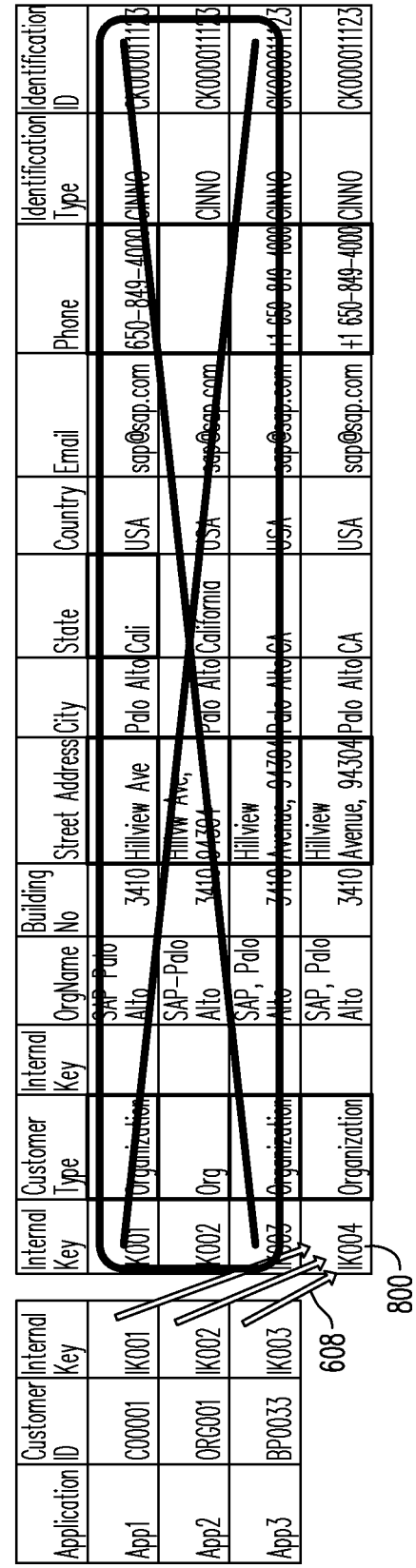
FIG. 10A
FIG. 10B

DE-DUPLICATION IN MASTER DATA MANAGEMENT

BACKGROUND

A data management system may execute several applications for processing data. Two or more of the applications may create independent data records representing a same entity. Because the records represent the same entity, the data within the records may be substantially duplicative. For example, a loan processing application may create a record for a customer, while a personal banking application may create a second record for the same customer.

Conventional data management systems may execute regular operations to consolidate their data and remove duplicate records. Identification and removal of duplicate records is a time consuming and memory-intensive task.

Systems and methods are desired which support efficient de-duplication of data records.

BRIEF DESCRIPTION OF THE DRAWINGS

FIG. 4A is a table according to some embodiments.
FIG. 4B is a table according to some embodiments.
FIG. 4C is a table according to some embodiments.
FIG. 7 is a table according to some embodiments.
FIG. 8 is a record according to some embodiments.
FIG. 9 is a prior art table.
FIG. 10A is a table according to some embodiments.
FIG. 10B is a table according to some embodiments.

DETAILED DESCRIPTION

Figure 1:
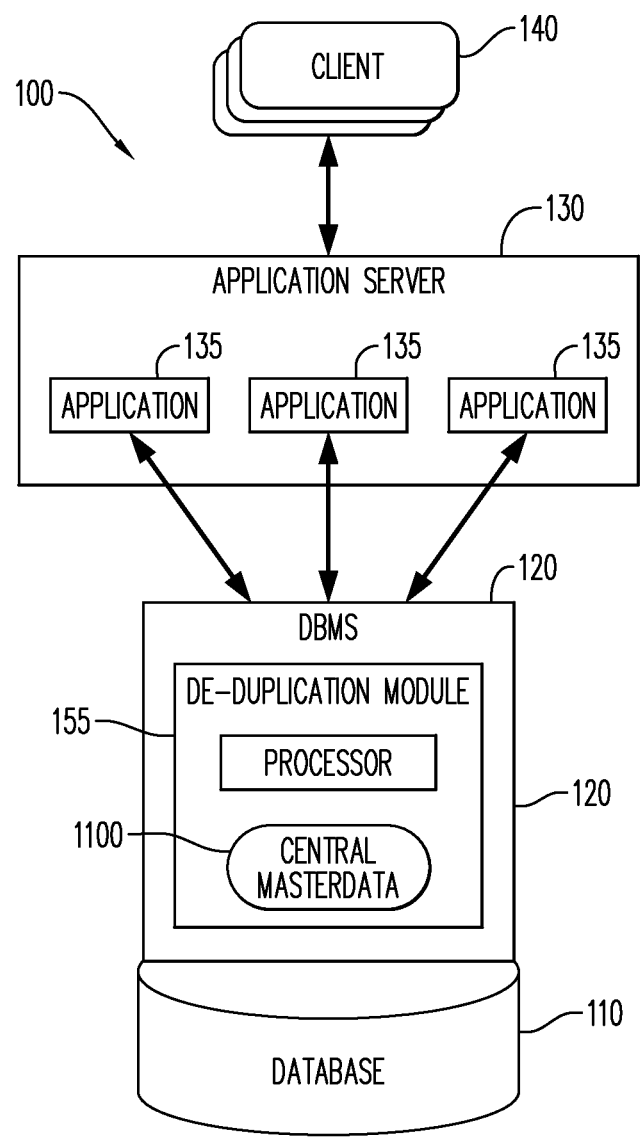
FIG. 1 is a block diagram of a system architecture according to some embodiments.
Figure 2:
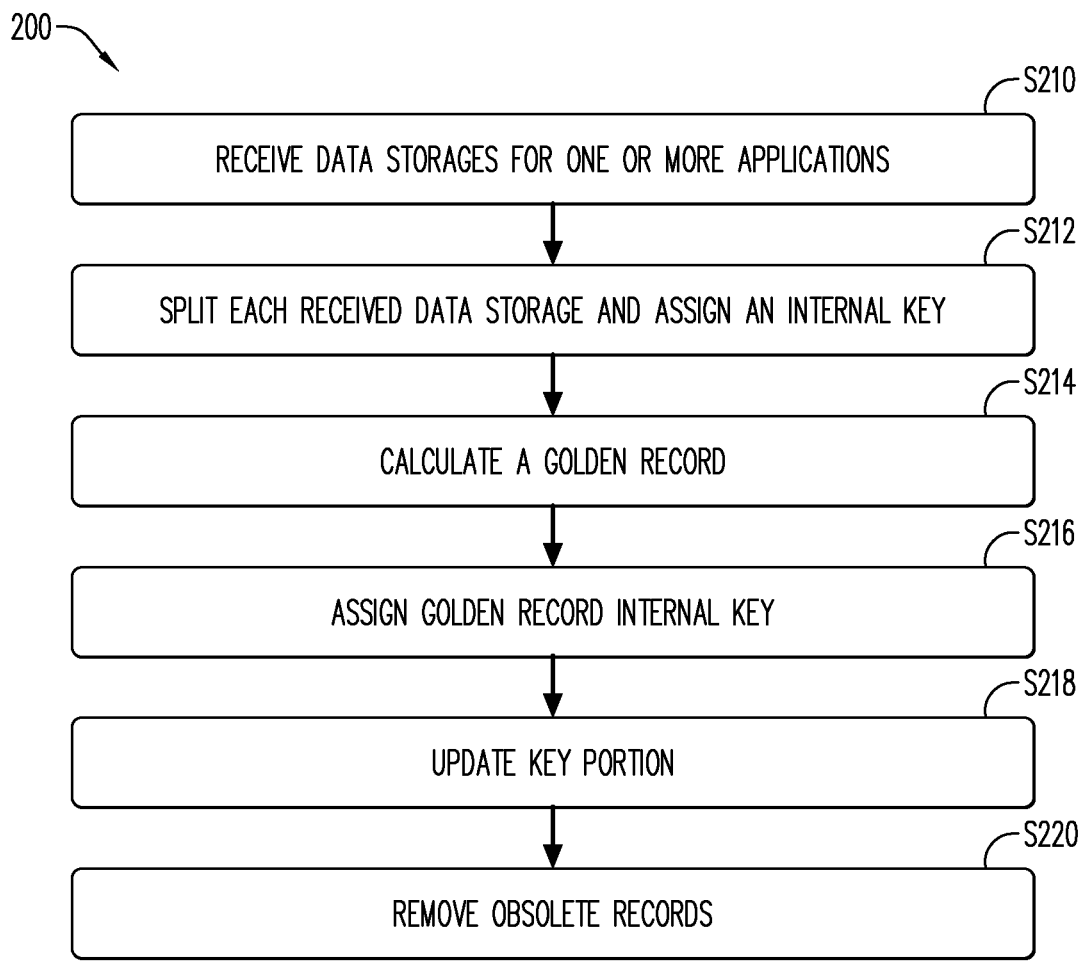
FIG. 2 is a flow diagram of a process according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Master data may consist of data that is essential to operations in a specific enterprise. The types of information treated as master data may vary from one industry to another, and even from one enterprise to another within the same industry. "Master data" may refer to a collection of business objects an enterprise uses, that is often in the form of people and products, but not typically transactional data. Often transactional data may not be duplicated, as every time the transaction occurs, it's a new transaction. For example, if two sales orders are made exactly by a same customer, with a same product & amount, they are representing two different purchases. Duplication of a transactional record may happen in rare instances of some replication scenarios where the same document is replicated from multiple sources. For example, a sales order may be a transactional document, and the product recorded in the document (e.g., laptop, headphone, etc.) may be represented by master data. Additionally, the purchaser in the transactional document may be represented by master data.

In an enterprise, one or more applications use master data—either the application creates the master data, or consumes the master data. Two or more applications may create a master data record representing a same entity. Duplicate records may, for example, be created by different departments creating master data for different reasons. The different departments may not use a central existence check during creation of the master data to determine if the master data already exists. The departments may then bring the master data together to a central system. For example, in a banking enterprise, one application at the bank's loan department may create a master data record for person A and assign that record an identification number. Person A may then contact the bank's credit card department to procure a credit card. Another application at the bank's credit card department may create a master data record from person A, and assign that record an identification number that is different from the identification number assigned by the bank's loan department. As another example, a purchase department may recognize an organization as a supplier for a product, and a sales department sells a different product to the same organization identifying the organization as a customer.

Duplicate records may also be created in a case that applications are disconnected from a central master data system, and may only connect to the system for consolidation, thereby each saving a duplicate record at the system. Alternatively, the disconnected applications may become connected with a central master data maintenance service, with each saving a duplicate record at the service. Various overheads may also cause an application to avoid performing a duplicate check before creating a duplicate record. Additionally, a record may be created without a duplicate check for various other reasons, knowingly or unknowingly.

The data management system may then analyze the master data records for the entire enterprise and determine there are duplicate records. The data management system may execute a consolidation process to remove the duplicate records. As used herein, the terms "master data record" and "record" may be used interchangeably.

Typically, the consolidation process may involve cleansing the record, standardizing the records, identifying the duplicates, and removing the duplicate items in the master data records. The duplicate may conventionally be identified by a check across a category of master data. For example, the check may be performed for all customers across at least one category of an identification number, street address, phone number, email address, social security number, etc. The duplicate records may be marked, and then an archive process may remove the duplicates. It is noted that when there are existing references or usages of this record, then archiving may not be feasible. As such, all of the records may be kept in the system, which may form the overhead of the conventional process. Identification of duplicates and removal thereof is a time-consuming process, which may be executed centrally in a consolidation system or a central service like master data service. Additionally, due to the duplicate records (even after identifying the duplicate), the only way to unify the duplicate records with the latest/enriched/cleansed data is to update individually all of the duplicates with the same data, which may be time consuming and memory-intensive.

Embodiments provide a de-duplication module for optimally removing the duplicates and resolving the need to maintain multiple copies of a same master data at a same time. In one or more embodiments, the de-duplication module may separate the master data into different storage portions, identify duplicates, unify the duplicates, update the portions with reference to a unified master data, and remove the obsolete records.

FIG. 1 is a block diagram of system architecture 100 according to some embodiments. Embodiments are not limited to a three-tier database architecture 100.

Architecture 100 includes database 110, database management system or service (DBMS) 120, application server 130, applications 135, client 140, and a de-duplication module 155. Applications 135 may comprise server-side executable program code (e.g., compiled code, scripts, etc.) executing within application server 130 to receive queries from clients 140 and provide results to clients 140 based on data of database 110 per the DBMS 120. In one or more embodiments, the de-duplication module 155 may receive an application master data record 300 (FIG. 3) from two or more applications, and may provide at least one of: access to a central master data record in place of the application master data record, or the central master data record itself.

Application server 130 provides any suitable interfaces through which clients 140 may communicate with the applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110. It is noted that one application may be responsible for creating duplicates, as multiple users of a same application may be trying in parallel to create a same record, or an application does not do duplicate checking when creating a record.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by at least one of: applications 135 and the de-duplication module 155. For example, database 110 may store existing application master records 300, that may be used by the de-duplication module 155 to generate a golden record, which in turn may be used to remove obsolete records.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Client 140 may comprise one or more individuals or devices executing program code of a software application for presenting and/or generating user interfaces to allow interaction with application server 130. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. The client 140 may also or alternatively present user interfaces by executing a standalone executable file (e.g., an .exe file) or code (e.g., a JAVA applet) within a virtual machine.

Figure 13:
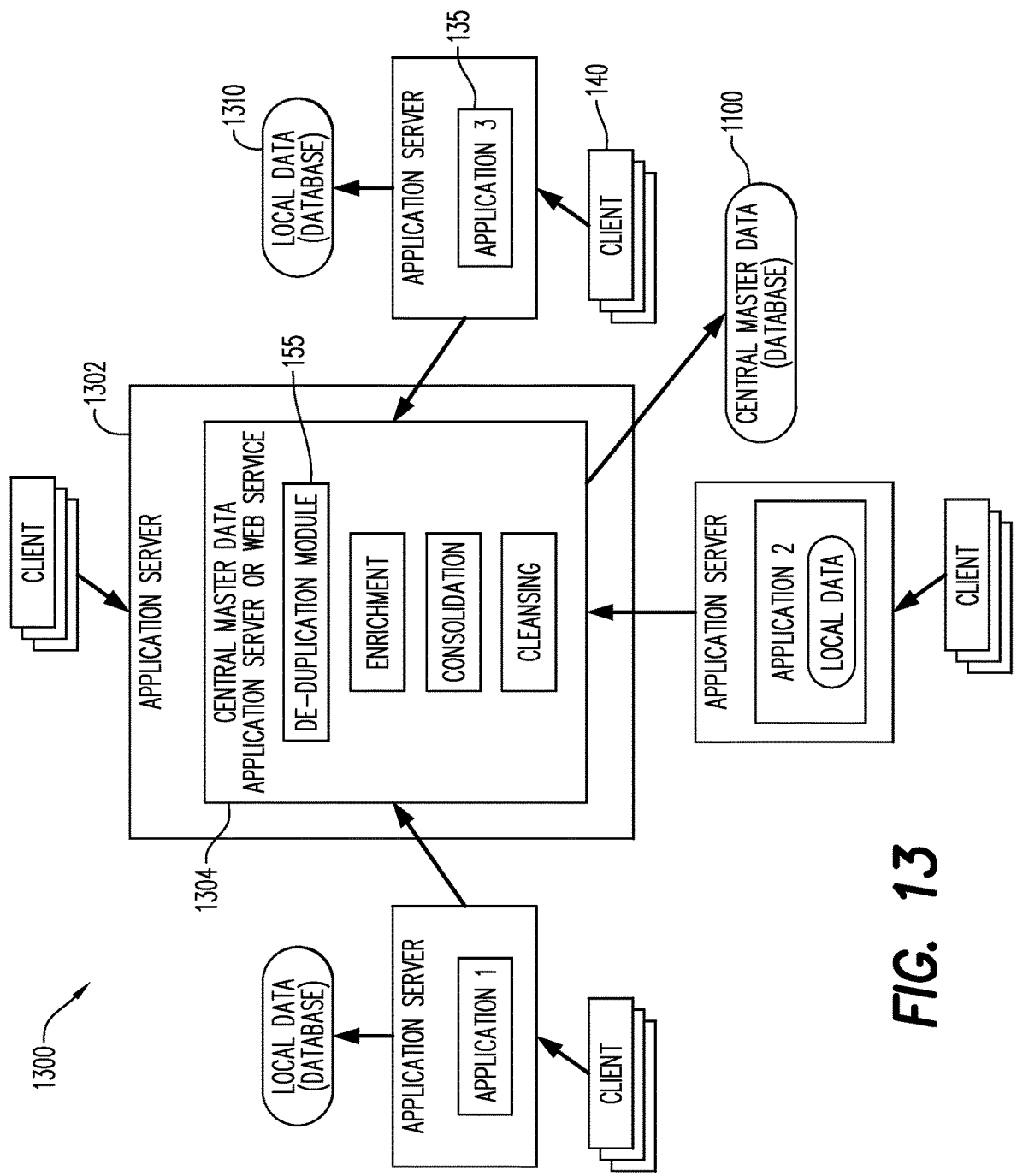
FIG. 13 is a block diagram of a system architecture according to some embodiments.

While FIG. 1 shows a 3-tier architecture 100, other suitable architectures may be used. For example, FIG. 13 includes another system architecture 1300 whereby a central application server 1302 includes a central master data application server/web service 1304. The central master data application server/web service 1304 may include the de-duplication module 155, as described above. Further in the architecture shown herein, each application 135 may be associated with its own respective application server 130, and its own local data database 1310. The components in FIG. 13 may operate the same as, or substantially the same as, the like components described above with respect to FIG. 1. A difference between the architecture in FIG. 1 and FIG. 13 may be that each application 135 may access the central application server 1302 for use of the de-duplication module 155, and other features provided thereby (e.g., enrichment, consolidation, and cleansing).

FIGS. 2-11 include a flow diagram of a process 200 (FIG. 2) described with respect to the system 100 and tables according to some embodiments. Process 200 may be executed by application server 130 according to some embodiments, e.g., by execution of the de-duplication module 155 to create a central master data record and remove duplicates from the system. In one or more embodiments, the application server 130 may be conditioned to perform the process 200, such that a processor 1210 (FIG. 12) of the server 130 is a special purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Any user interface described herein may be presented on any type of display apparatus (e.g., desktop monitor, smartphone display, tablet display) provided by any type of device (e.g., desktop system, smartphone, tablet computer).

Prior to the start of the process 200, an application 135 is executed, and at least one master data storage 300 is at least one of generated and consumed. As used herein, the terms "data store" and "data storage" may be used interchangeably. In one or more embodiments, the master data storage 300 may include one or more records 302, and each record may include data values 304 that define one or more objects 306. It is noted that while the data storages shown herein are in the form of tables, any suitable data storages may be used (e.g., JSON documents as in object store like MongoDB/others, flat file, excel, etc.). As used herein, "Master Data" may represent the objects that are shared across an enterprise.

Figure 3A:
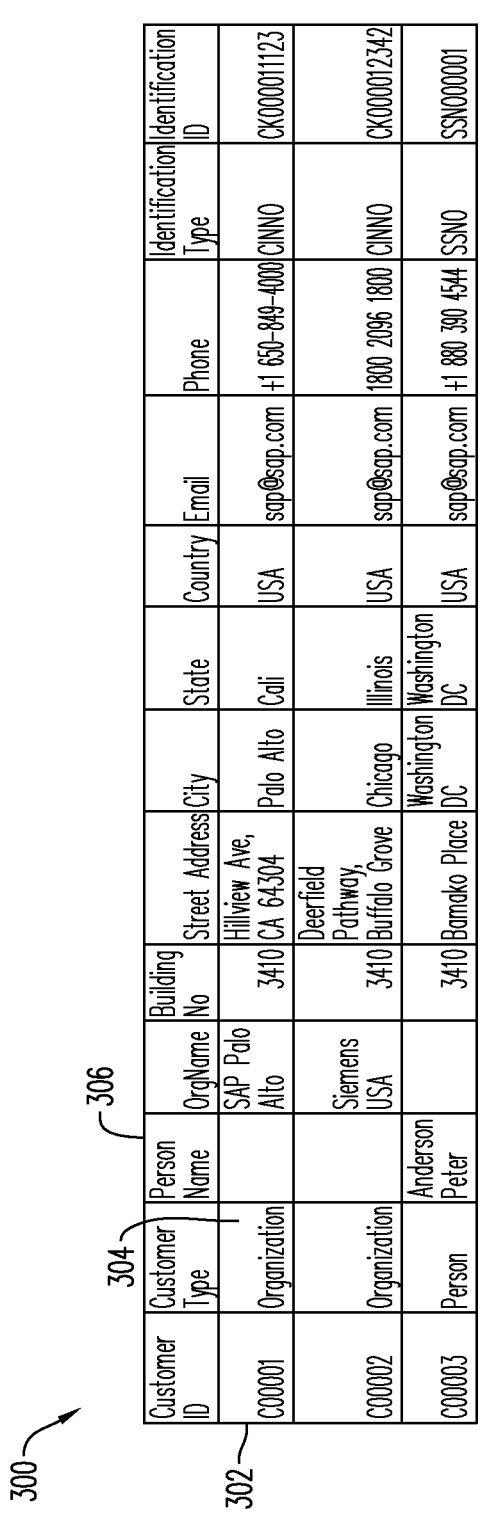
FIG. 3A is a table according to some embodiments.
Figure 3B:
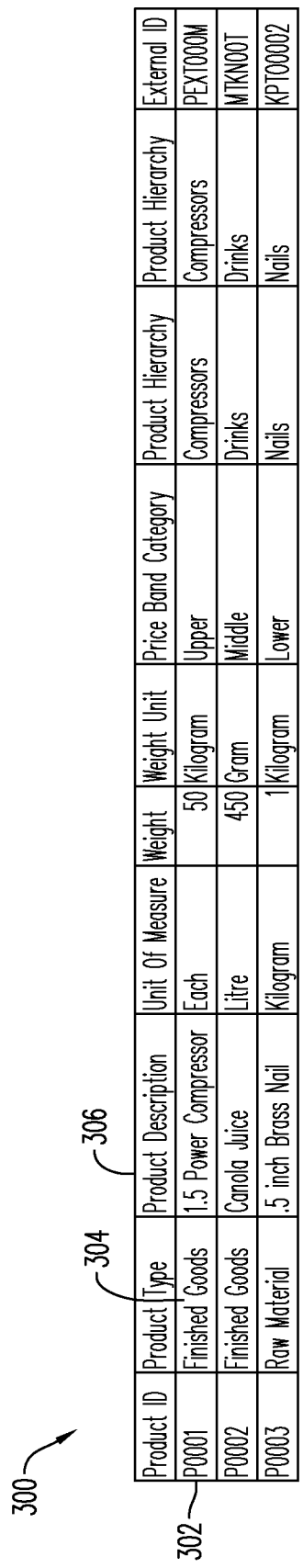
FIG. 3B is a table according to some embodiments.

As a non-exhaustive example described with respect to FIGS. 3A and 3B, the application 135 may be related to a sales transaction that includes both customer master data and product master data.

A customer master data storage 300 is shown in FIG. 3A. The customer master data storage 300 includes three records 302 (C00001, C00002, C00003), where each record occupies a row in the data storage 300. Each record 302 may be defined by data values 304 for the one or more objects 306. As shown herein, the customer master data storage 300 includes the following objects: Customer ID, Customer Type, Person Name, OrgName, Building No, Street Address, City, State, Country, Email, Phone, Identification Type, and Identification ID. Other suitable objects may be used. As used herein, the terms "object," "field," and "parameter" may be used interchangeably. It is noted that, for a given record, no data value may be included for at least one specific object 306. For example, for record C00001 and C00002, there is no data value 304 for the Person Name object 306, while for record C00003, "Anderson Peter" is the data value 304 for the Person Name object 306.

As another non-exhaustive example, a product master data storage 300 is shown in FIG. 3B. The product master data storage 300 includes three records 302 (P0001, P0002, P0003), and the following objects: Product ID, Product Type, Product Description, Unit of Measure, Weight, Weight Unit, Price Band Category, Product Hierarchy, Product Hierarchy, External ID.

Typically, an enterprise includes more than one application 135 that, when executed, generates or consumes a master data storage. Further, each of these applications may include at least one same data value for a given object, making a duplicate record. It is noted that the "same" data value may be represented differently in the store 300, while referring to the same value (e.g., for object "customer type," one application may include a data value of "Org," while another application may include a data value of "Organization," where both refer to "organization").

As a non-exhaustive example described with respect to FIGS. 4A-4C, for the given Org Name object 306 of "SAP Palo Alto" data value 304, a first record 302a, used by a first application ("Application 1") 135, includes a data value 304 of "C00001" in the Customer ID object 306 (FIG. 4A). For the same given Org Name object 306 of "SAP Palo Alto," a second record 302b, used by a second application ("Application 2") 135, includes a data value 304 of "ORG001" in the Customer ID object 306 (FIG. 4B). Also, for the same given Org Name object 306 of "SAP Palo Alto," a third record 302c, used by a third application ("Application 3") 135, includes a data value 304 of "BP0033" in the Customer ID Object 306 (FIG. 4C). As such, for the same customer with Org Name "SAP Palo Alto," there are three applications creating three duplicate records, although they are assigned different customer IDs.

Figures 5, 6:
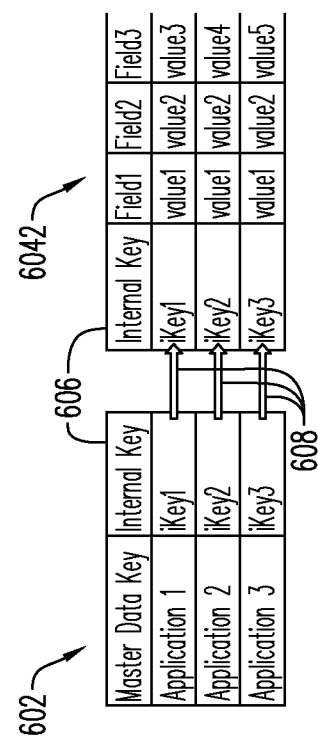
FIG. 5 is a table according to some embodiments.
FIG. 6 is a table according to some embodiments.
Figure 11:
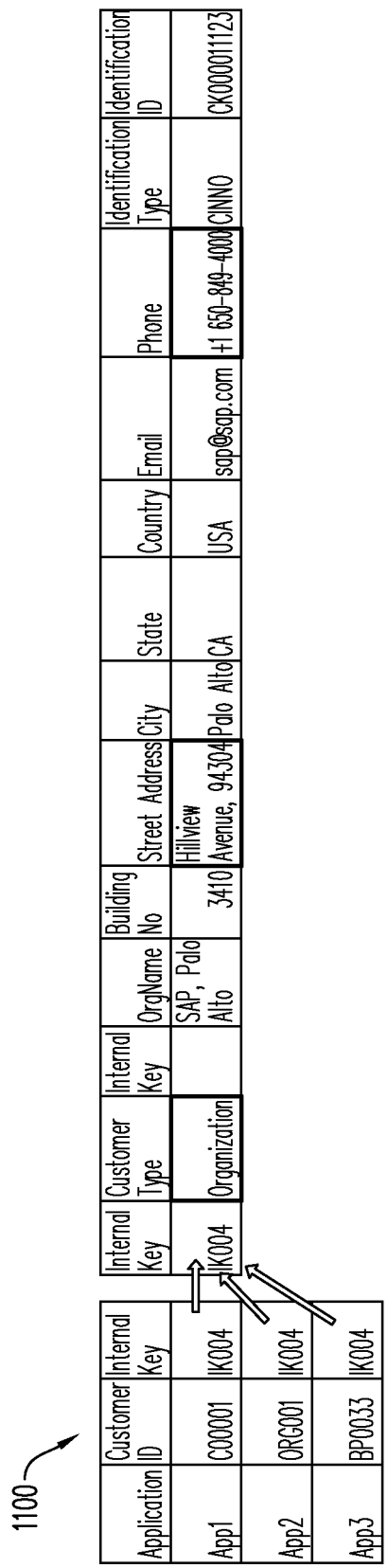
FIG. 11 is a table according to some embodiments.

Each application 135 may store their records (and any others forming the data storage 300) in the database 110. Conventionally, the records may be stored in the database 110 in the same format in which they are received. Continuing with the example above, for the Org Name object 306 of "SAP Palo Alto," a central system master data storage 500 may include three duplicate records for this same customer, and conventionally store the records in the form in which they are received from the application, as shown in FIG. 5. Conventionally, when an application requests master data, the data values in the record for that particular application are returned to the application.

Turning to the process 200, initially, at S210, two or more data storages 300 for two or more applications 135 are received at the central database 110. Each data storage 300 may be split into at least two storage portions—a key portion 602 and a data portion 604 (FIG. 6)—that may be joined by an internal key 606 assigned thereto in S212. In one or more embodiments, the internal key is assigned to each record and is stored in both the key portion 602 and the data portion 604 for that record. In one or more embodiments, the key portion (and therefore the split) may be defined by an application developer during development of the application. While the example shown herein splits the key portion along customer ID, the key portion may include any object and any number of fields/columns. For example, product ID+Variant ID (e.g., Tshirt+size Medium+Blue) or SupplierID+VersionID, etc. In one or more embodiments, the key of the master data object that is exposed to the consumers should be split from the data portion of the master data. In one or more embodiments, the internal key 606 may not be exposed to the applications 135. In one or more embodiments, the internal key 606 may be assigned to each application 135 and may map 608 the key portion 602 to the data portion 604 in the central database 110. As such, when one of the applications requests master data, the DBMS 120 executes a join from the key portion 602 to the data portion 604. A benefit of this separation may be described further below with respect to FIG. 11.

As a non-exhaustive example, FIG. 7 shows the duplicate records received from three applications that are split into the key portion 602 and the data portion 604, and that are assigned the internal key 606 per S212.

Then, in S214, a golden record 800 (FIG. 8) is calculated. The golden record 800 is a single well-defined version of all the data entries in an enterprise, that has been calculated from all of the duplicate records generated by the applications 135. The golden record 800 may serve as the complete record, or source, that captures all of the accurate necessary information. It is noted that the golden record 800 is a unified, de-duplicated, cleansed and enriched record. In one or more embodiments, the golden record 800 may be calculated by selecting a value for each object from among the duplicate records to be the representative value for the object in all of the records. In one or more embodiments, the golden record 800 may be calculated based on one or more rules provided by the enterprise. The values in the golden record 800 may be at least one of selected automatically by the system 100 or manually by a user.

As described above, two (or more) duplicate records may have a "same" data value for an object that is represented differently in each record, while referring to the same value. The differences may be a result of the way the values were collected. For example, there may be typographical errors, or in one application a value for a street address includes the word "street," (e.g., 100 Main Street) while in another application the value for the street address includes the abbreviation "St." (e.g., 100 Main St.)

As shown in the data portion 604 in FIG. 6, for example, Field3 306 (object) includes three different values 304 (Value 3, Value 4, Value 5)—one mapping to each of Application 1, Application 2, and Application 3 in the key portion 602.

Similarly, continuing with the non-exhaustive example described above, in the central system master data storage 500 shown in FIG. 5, Applications 1, 2, and 3 have different data values 304 in the Customer Type object 306, the Street Address object 306 and the Phone object 306.

The golden record 800, calculated in S214, is a single record with one value 304 for the Customer Type object 306 (i.e., Organization), one value 304 for the Street Address object 306 (i.e., Hillview Avenue, 94304) and one 304 for the Phone object 306 (i.e., +1 650-849-4000).

Conventionally, a golden record is created as part of the typical de-duplication process. Then, all of the records in the central master data storage are updated with the golden record values, as indicated in prior art FIG. 9. As such, conventionally, the central master data storage may include multiple records that are the same. For the example used herein, the conventional central master data storage may include four records—one for each of the three applications, and one golden record. When an application requests data values from the conventional central master data storage, the data values may be retrieved from the specific record for that particular application. However, having multiple records increases storage costs, and as the records include the same data value, the multiple records are redundant. Also, the conventional system may at least one of: (1) send the golden record to each application when the golden record is available, to locally replace the application values with the golden record values; and (2) indicate to the applications that the golden record is available, and the application may retrieve the golden record values per the application's process. Another noted problem with the conventional de-duplication process may be that after golden record values are merged with the individual application records, when an update occurs for one of the application records, the golden record process may need to be repeated to determine whether an updated golden record is to be calculated. If the updated golden record is to be calculated, then all of the records associated with that golden record may need to be merged with the updated golden record. Keeping all of the records in-sync with this conventional de-duplication process may be a process with a large overhead cost.

Turning back to the process 200, after the golden record 800 is calculated in S214, the golden record 800 is assigned a golden record internal key 1002 in S216 (FIG. 10A). Then in S218, the key portion 602 is updated with the golden record internal key 1002, such that each of the originally assigned internal keys 606 is replaced with the golden record internal key 1002 (FIG. 10B). After the key portion 602 is updated with the golden record internal key 1002 for each application, each of the applications in the key portion 602 maps 608 to the golden record 800 in the data portion 604. Continuing with the example, in FIG. 10B, the originally assigned internal key 606 for App1 ("IK001") is replaced with the golden record internal key 1002 ("IK004"); the originally assigned internal key 606 for App2 ("IK002") is replaced with the golden record internal key 1002 ("IK004"); and the originally assigned internal key 606 for App3 ("IK003") is replaced with the golden record internal key 1002 ("IK004"). As a result of the replaced internal keys, each of App1, App2, and App3 map 608 to the golden record 800 in the data portion 604.

Next, the data portion 604 is updated to remove the obsolete records (i.e. records that no longer have an internal key) associated with the originally assigned internal keys in S220, as shown, for example, by the crossed-out portion in FIG. 10B. In one or more embodiments, the data portion of each data record is removed where the internal key in the data portion is different from the internal key in the key portion. In this way, the duplicate records may be entirely removed from the system. An advantage of removing the duplicates may be to make memory space available. It is also noted, by mapping all of the applications in the key portion 602 to the single golden record 800 in the data portion 604, when one of the applications has an update, the update may only need to be reflected in the single golden record, instead of updating each of the records individually, thereby decreasing overhead costs. Additionally, by mapping all of the applications in the key portion 602 to the single golden record 800 in the data portion 604, each application is viewing the same image of a single source, which may decrease opportunities for data to become out of sync.

After the obsolete records are removed, the central master data storage 1100 is generated. In one or more embodiments, the central master data storage 1100 may then be stored in the database 110. Following generation of the central master data storage 1100, when one of the applications requests master data, the DBMS 120 executes a join from the key portion 602 to the data portion 604, which now only includes the single golden record 800. For example, in one or more embodiments, a request for data values may be received from a first application. Then, the golden record internal key associated with the first application may be identified in the central master data storage 1100. The data values from the golden record data portion may be retrieved and then returned to the first application.

Figure 12:
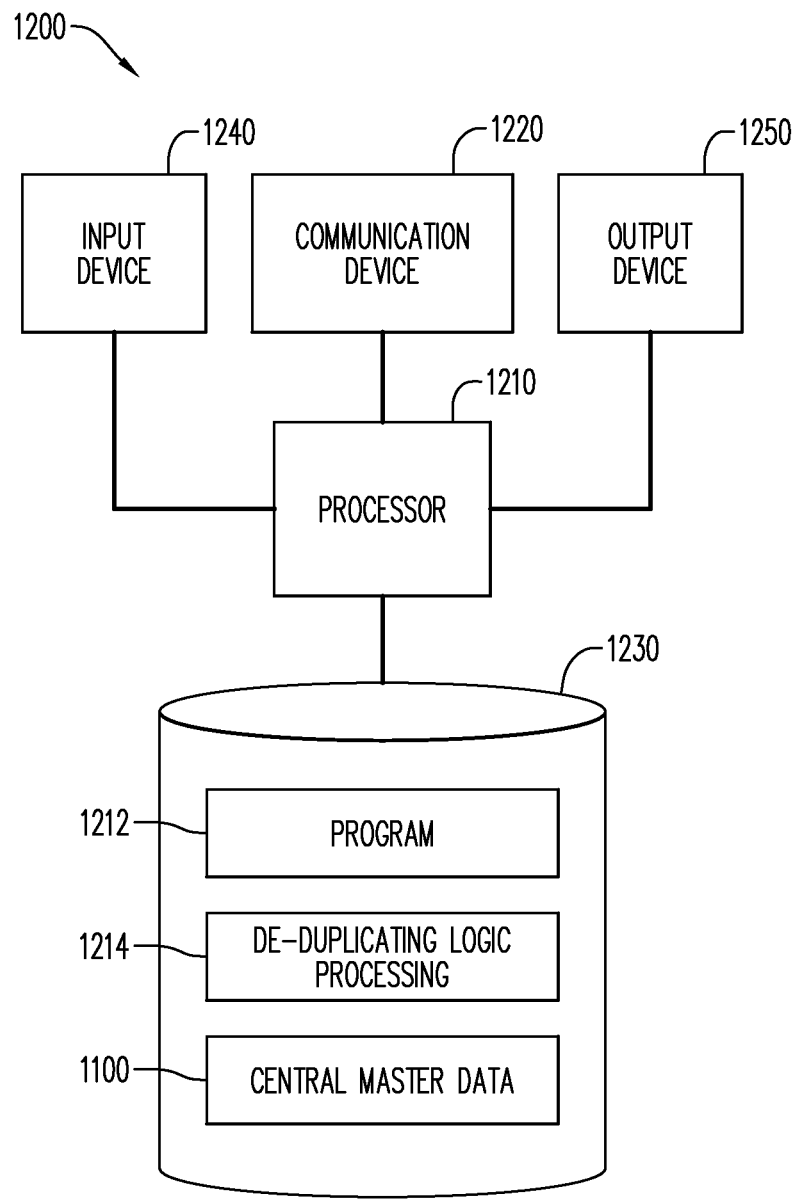
FIG. 12 is a block diagram of a system according to some embodiments.

FIG. 12 is a block diagram of apparatus 1200 according to some embodiments. Apparatus 1200 may comprise a general- or special-purpose computing apparatus and may execute program code to perform any of the functions described herein. Apparatus 1200 may comprise an implementation of one or more elements of system 100/1300. Apparatus 1200 may include other unshown elements according to some embodiments.

Apparatus 1200 includes de-duplication processor 1210 operatively coupled to communication device 1220, data storage device 1230, one or more input devices 1240, one or more output devices 1250 and memory 1260. Communication device 1220 may facilitate communication with external devices, such as application server 130. Input device(s) 1240 may comprise, for example, a keyboard, a keypad, a mouse or other pointing device, a microphone, knob or a switch, an infra-red (IR) port, a docking station, and/or a touch screen. Input device(s) 1240 may be used, for example, to manipulate graphical user interfaces and to input information into apparatus 1200. Output device(s) 1250 may comprise, for example, a display (e.g., a display screen) a speaker, and/or a printer.

Data storage device/memory 1230 may comprise any device, including combinations of magnetic storage devices (e.g., magnetic tape, hard disk drives and flash memory), optical storage devices, Read Only Memory (ROM) devices, Random Access Memory (RAM) etc.

The storage device 1230 stores a program 1212 and/or de-duplication platform logic 1214 for controlling the processor 1210. It is noted that program 1212 and/or de-duplication platform logic 1214 may also be stored and executed from an application server or from any other environment that can execute software instructions. The processor 1210 performs instructions of the programs 1212, 1214, and thereby operates in accordance with any of the embodiments described herein, including but not limited to process 200.

The programs 1212, 1214 may be stored in a compressed, uncompiled and/or encrypted format. The programs 1212, 1214 may furthermore include other program elements, such as an operating system, a database management system, and/or device drivers used by the processor 1210 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices of may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid-state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
at least one application, wherein a data storage is associated with each application;
a de-duplication module;
a de-duplication processor in communication with the de-duplication module and operative to execute processor-executable process steps to cause the system to:
receive a data storage for each of the at least one application, wherein a first data storage and a second data storage include a same record or the one data storage includes two or more of the same record, and each record includes a plurality of objects;
separate the records into a key storage portion and a data storage portion, wherein the key storage portion includes at least one object, the data storage portion includes the remaining objects of the record, the key storage portion includes data absent from the data storage portion, and separation disjoins the key storage portion from the data storage portion;
assign an internal key to each record, wherein the internal key is stored in both the key storage portion and the data storage portion for that record;
calculate a golden record including golden record values;
assign a golden record internal key to the golden record;
replace each internal key in the key storage portion with the golden record internal key; and
remove the data storage portion of each data record where the internal key in the data storage portion is different from the internal key in the key storage portion.

2. The system of claim 1, wherein the values in the data record are non-transactional data.

3. The system of claim 1, wherein the same records include the same object.

4. The system of claim 3, wherein the same objects in the same records include different values in at least one of the same objects prior to calculation of the golden record.

5. The system of claim 1, wherein the internal key is not exposed to outside applications.

6. The system of claim 1, wherein the data storage is a table.

7. The system of claim 1, further comprising processor-executable process steps to cause the system to:
  receive a request for data values from a first application of the at least one application;
  identify the golden record internal key associated with the first application;
  retrieve data values from the golden record; and
  return the retrieved data values to the first application.

8. The system of claim 1, further comprising processor-executable process steps to cause the system to:
  receive a change to the data storage associated with at least one application; and
  re-calculate the golden record values.

9. The system of claim 1, wherein the same record includes same data values for at least a first object of the plurality of objects, the same data values represented differently in the first data storage and the second data storage or the one data storage.

10. A computer-implemented method comprising:
  receiving data storages for each of the at least two applications, wherein a first data storage and a second data storage include a same record, and each record includes a plurality of objects;
  separating the records into a key storage portion and a data storage portion, wherein the key storage portion includes at least one object, the data storage portion includes the remaining objects of the record, the key storage portion includes data absent from the data storage portion, and separation disjoins the key storage portion from the data storage portion;
  joining the key storage portion to the data storage portion by assigning an internal key to each record;
  calculating a golden record including golden record values;
  assigning a golden record internal key to the golden record;
  replacing each internal key in the key storage portion with the golden record internal key;
  joining each record in the key storage portion to the golden record via the golden record internal key; and
  removing the data storage portion of each record where the internal key in the data storage portion is different from the internal key in the key storage portion.

11. The method of claim 10, wherein joining the key storage portion to the data storage portion with the internal key further comprises:
  storing the internal key in both the key storage portion and the data storage portion for each record.

12. The method of claim 10, wherein the record from the first data storage and the record from the second data storage include the same objects.

13. The method of claim 12, wherein the same objects in the records include different values in at least one of the same objects prior to calculation of the golden record.

14. The method of claim 10, wherein the internal key is not exposed to outside applications.

15. The method of claim 10, further comprising:
  receiving a request for data values from a first application of the at least two applications;
  identifying the golden record internal key associated with the first application;
  retrieving data values from the golden record; and
  returning the retrieved data values to the first application.

16. The method of claim 10, further comprising:
  receiving a change to the data storage associated with at least one application; and
  re-calculating the golden record values.

17. A non-transitory computer-readable medium storing program code, the program code executable by a computer system to cause the computer system to:
  receive data storages for each of the at least two applications, wherein a first data storage and a second data storage include a same record, and each record includes a plurality of objects;
  separate the records into a key storage portion and a data storage portion, wherein the key storage portion includes at least one object, the data storage portion includes the remaining objects of the record, the key storage portion includes data absent from the data storage portion, and separation disjoins the key storage portion from the data storage portion;
  assign an internal key to each record, wherein the internal key is stored in both the key storage portion and the data storage portion for that record;
  calculate a golden record including golden record values;
  assign a golden record internal key to the golden record;
  replace each internal key in the key storage portion with the golden record internal key; and
  remove the data storage portion of each data record where the internal key in the data storage portion is different from the internal key in the key storage portion.

18. The medium of claim 17, wherein the same object in the at least two same records include different values in at least one of the same objects prior to calculation of the golden record.

19. The medium of claim 17, wherein the data storage is a table.

20. The medium of claim 17, further comprising program code to cause the system to:
  receive a request for data values from a first application of the at least two applications;
  identify the golden record internal key associated with the first application;
  retrieve data values from the golden record; and
  return the retrieved data values to the first application.

* * * * *